United States Patent Office 3,799,948
Patented Mar. 26, 1974

3,799,948
PROCESS FOR PREPARING PURE EPICHLORO-HYDRIN BY EXTRACTION WITH A POLYHYDRIC ALCOHOL
Manfred Kruger, Offenbach, Ewald Noll, Grosskrotzenburg, Gerd Schreyer and Herbert Tanner, Grossaunheim, and Wolfgang Weigert, Offenbach (Main), Germany, assignors to Deutsche Gold- und Silber-Scheideanstalt vormals Roessler, Frankfurt am Main, Germany
No Drawing. Filed May 13, 1971, Ser. No. 143,702
Claims priority, application Germany, May 15, 1970, P 20 23 839.5
Int. Cl. C07c 1/16
U.S. Cl. 260—348.5 L
6 Claims

ABSTRACT OF THE DISCLOSURE

Process for recovering pure carboxylic acid free epichlorhydrin from the reaction mixtures containing the same and which have been obtained in reacting allylchloride with percarboxylic acid which comprises extracting the reaction mixture with glycerol or a saturated diol whose boiling point is higher than that of the carboxylic acid formed from the percarboxylic acid and thereafter separately working up the extract and the carboxylic acid free reaction mixture to recover the carboxylic acid and epichlorohydrin.

---

This invention relates to a process for continuously separating epichlorohydrin from the reaction mixtures obtained following epoxidation of allylchloride with percarboxylic acid solutions. More particularly, this invention relates to a process for recovering pure carboxylic acid free epichlorohydrin from the reaction mixtures containing the same and which have been obtained in the reaction of allylchloride with percarboxylic acid.

It is known to epoxidize allylchloride with anhydrous peracetic acid to form epichlorohydrin. The epichlorohydrin and the acetic acid remaining after the reaction have almost the same boiling point. They accordingly cannot or only with great difficulty be separated by distillation.

According to German Auslegeschrift 1,051,834 starting from such reaction mixtures, epichlorohydrin in the form of an azeotropic mixture with water can be distilled off under reduced pressure in a distillation column from the acetic acid formed in the epoxidation.

According to German Auslegeschrift 1,251,299, epichlorohydrin in the same manner together with water and the solvent ethylacetate can be separated off at the head of a distillation column as a ternary azeotrope.

These processes have the considerable disadvantage that a complete separation of the acetic acid from the epichlorohydrin is only possible with the expenditure of great costs. In addition, in the distillative separation, a part of the epichlorohydrin reacts with the acetic acid so that in this method losses of epichlorohydrin must be taken into consideration.

According to the Belgian Pat. 709,293, the acetic acid formed in the epoxidation can be separated by extraction with water whereby the resulting aqueous phase is after washing with the olefin used in the reaction. This method has the disadvantage that in this separation very dilute aqueous acetic acid solutions are formed from which the acetic acid can be recovered in the form of a pure product only by expenditure of considerable sums for apparatus and energy.

In accordance with the invention, it has now been found that the separation of epichlorohydrin from the carboxylic acids derived from the starting percarboxylic acids can be carried out in a technically simple manner if the reaction mixture following the epoxidation of the allyl chloride with the anhydrous percarboxylic acid is extracted with glycerol or with a saturated diol whose boiling point is higher than that of the carboxylic acid and which is substantially immiscible with the reaction mixture and if thereafter the extracted reaction mixture and if thereafter the extracted reaction mixture and the extract are worked up separately by distillation.

As diols there are advantageously used the lower glycols having 2–6 carbon atoms. Instances of preferred lower glycols are ethylene glycol, 1,2 and 1,3-propane diol and butane diols.

Instead of using a pure extracting agent, mixtures of the forenamed extraction agents can also be advantageously used.

It has further been found that the extraction activity of the used agent can be increased even further through addition thereto of a material which increases the ability of the glycerol or glycol to dissolve the carboxylic acid or which decreases the ability thereof to dissolve the epichlorohydrin. Such materials include salts, hydrated salts and water. These substances can also be advantageously used as mixtures. The salts or hydrated salts are used in the extraction agent in amounts up to saturation. The amount of added water can amount to up to 20% of the extraction agent used.

As salts, there are advantageously employed ammonium-, sodium-, potassium-, calcium- or aluminum salts of hydrochloric acid, acetic acid and propionic acid as well as sodium- or potassium salts of oxyacids such as lactic acid, salicylic acid, as well as of the polybasic acids of polybasic oxyacids such as oxalic acids, tartaric acid or citric acid. Preferred examples of salts are the acetates and chlorides which can be used also in the form of their hydrates.

The metal salts, their hydrates or the water serve to increase not only the extraction effect of the extraction agent, but they substantially inhibit any side reactions which take place and particularly those between the single components which have a tendency to occur because of the longer extraction times.

In the manufacture of epichlorohydrin, allyl chloride can conventionally be used with or without diluting agents such as hydrocarbons or esters. The extraction agent in the case it is necessary to use the same together with the substance which serves to increase the solubility therein of the carboxylic acid shall be introduced in amounts of 2–100 weight parts for each weight part of carboxylic acid. Preferably a weight ratio is used of 5–10:1.

The extraction is carried out in the known manner for solvent extraction. Advantageously, extraction columns are used into which the reaction mixture is introduced at the mid-portion and which is washed in countercurrent fashion with the extraction agent. The extract flowing off from the bottom of the column in order to be made substantially completely free of epichlorohydrin is preferably after extracted by introducing at the bottom end of the column, an extraction agent such as a low boiling aliphatic ester or halogenated hydrocarbon.

Advantageously such substances are used which are good solvents for epichlorohydrin and which in the working up are easily separated from the epichlorohydrin. Preferably there is used as an after-washing substance, allylchloride alone or together with a solvent already used in the manufacturing process of epichlorohydrin.

At the head of the extraction column, the reaction mixture freed from the carboxylic acid is taken off. At the bottom end of the column, an extract of the carboxylic acid in the extraction agent is taken off which additionally contains some solvent from the after extraction. From these mixtures, the pure carboxylic acid is recovered by distillation. Similarly, the epichlorohydrin is recovered from the now carboxylic acid free reaction mixture by distillation.

As the temperature for the extraction, room temperature is most suitable. However, temperatures above and below room temperature can be used if they do not change the reaction mixture.

According to the density ratio of the extraction agent and the reaction mixture, the part of the column at which the carboxylic acid free reaction mixture and the extract are taken off, i.e., whether the same is taken off at the head or the sump of the column, can be reversed.

The technical advance of the invention lies in providing a process for preparing carboxylic acid free epichlorohydrin in which a very good separation of the epichlorohydrin and carboxylic acid, as well as in a very simple recovery procedure of the extracted carboxylic acid and epichlorohydrin is made possible. During the recovery of the pure acetic acid from the aqueous extract according to Belgian Pat. 709,293, multirectification and extraction stages are needed. In accordance with the invention, a single rectification stage is all that is necessary.

Therefore, the recovery of the carboxylic acid formed in the epoxidation of allylchloride with percarboxylic acid is made extremely simple in that the acid is recovered in concentrated form and simultaneously the preparation of the carboxylic acid free epichlorhydrin is made much more efficient and economical.

According to the process of Belgian Pat. 709,293 there are obtained only very dilute aqueous carboxylic acid solutions which cannot be converted into usable percarboxylic acids in a simple manner.

The following examples are given in order to more fully illustrate the invention. The invention is in nowise to be construed as limited thereby.

EXAMPLE 1

A mixture of 50 g. allylchloride, 9 g. epichlorohydrin and 6 g. acetic acid was shaken with 25 g. ethyleneglycol at room temperature and the establishment of the distribution equilibrium awaited. The light phase (54.5 g.) thereby obtained contained 13.6 weight percent epichlorohydrin, 2 weight percent acetic acid, and 84 weight percent allylchloride, the heavy phase (35.5 g.) contained 4.1 weight percent epichlorohydrin, 13.3 weight percent acetic acid, and 15 weight percent allylchloride.

EXAMPLE 2

Following establishment of the distribution equilibrium, the upper phase (59.5 g.) obtained by shaking at room temperature, a mixture of 50 g. allylchloride, 9 g. epichlorohydrin and 6 g. acetic acid with a solution of 3.75 g. lithiumchloride in 21.25 g. ethylene glycol contained 13.6 weight percent epichlorohydrin, 3.0 weight percent acetic acid, and 82 weight percent allylchloride, while the heavy phase (30.5 g.) in comparison contained 1.35 weight percent epichlorohydrin, 14.6 weight percent acetic acid, and 5.1 weight percent allylchloride.

EXAMPLE 3

A mixture of 50 g. allylchloride, 9 g. epichlorohydrin and 6 g. acetic acid was through shaking at room temperature with a solution of 3.75 g. sodium acetate in 21.25 g. ethylene glycol brought to distirbution equilibrium. The light phase (55 g.) thereby obtained contained 13.5% epichlorohydrin, 1.1% acetic acid and 85% allylchloride, while the heavy phase (35 g.) contained 3.5% epichlorohydrin, 15.7% acetic acid and 12% allylchloride.

EXAMPLE 4

A mixture which contained 75% allylchloride, 15% epichlorohydrin and 10% acetic acid was continuously fed at the rate of 1 liter/hour into a weak pulsating extraction column having a length of 3.70 m. and a cross-section of 4.7 cm. provided with 70 perforated plates of 12% penetration so that the mixture entered between perforated plate 39 and perforated plate 40. There was introduced at the head of the column 0.5 liter/hour of a solution of 15% anhydrous sodium acetate in ethylene glycol. The extract at the bottom of the column was after extracted with 0.4 liter/hour of allylchloride. After distribution equilibrium had set in, there was taken off at the top of the column a mixture which contained in addition to about 85 weight percent allylchloride and 13.6 weight percent epichlorohydrin only 0.05 weight percent acetic acid, while at the bottom of the column, there was taken off a mixture which in addition to ethylene glycol and sodium acetate contained 21.6 weight percent acetic acid, 18 weight percent allylchloride and 0.1 weight percent epichlorohydrin.

EXAMPLE 5

A mixture of 50 g. allylchloride, 9 g. epichlorohydrin and 6 g. acetic acid was shaken at room temperature with a solution of 3.25 g. of sodium acetate-trihydrate in 21.25 g. ethylene glycol and distribution equilibrium allowed to set in. The light phase (58 g.) which was thereby obtained contained 14.1% epichlorohydrin, 1.5% acetic acid and 84% allylchloride, while the heavy phase (32 g.) contained 2.5% epichlorohydrin, 16.0% acetic acid and 6.9% allylchloride.

EXAMPLE 6

Two mixtures as described in Example 3 to which however 20 g. benzene had been added were treated as set out in that example and brought to distribution equilibrium. The light phase (76.5 g.) which was obtained contained 9.5% epichlorohydrin, 1.2% acetic acid, 60% allylchloride and 25% benzene, the heavy phase (33.5 g.) contained 2.4% epichlorohydrin, 15.4% acetic acid, 7.8% allylchloride and 2.4% benzene.

EXAMPLE 7

A mixture of 50 g. allylchloride, 9 g. epichlorohydrin and 6 g. acetic acid was through shaking at room temperature with a solution of 3.75 g. sodium salicylate in 21.25 g. ethylene glycol brought to distribution equilibrium. The light phase (52.5 g.) which was obtained contained 12.7% epichlorohydrin, 1.7% acetic acid and 85% allylchloride, and the heavy phase (37.5 g.) contained 4.3% epichlorohydrin, 14.8% acetic acid and 16.5% allylchloride.

EXAMPLE 8

A mixture of 50 g. allylchloride, 9 g. epichlorohydrin and 6 g. acetic acid were through shaking at room temperature with a solution of 3.75 g. water in 21.25 g. ethylene glycol brought into distribution equilibrium. The light phase (59.5 g.) which was thusly obtained contained 13.6% epichlorhydrin, 2.5% acetic acid and 81% allylchloride, the heavy phase (30.5 g.) contained 3.0% epichlorohydrin, 15.1% acetic acid and 6.9% allylchloride.

EXAMPLE 9

A mixture of 38.5 g. allylchloride, 6.9 g. epichlorohydrin and 4.6 g. acetic acid was through shaking at room temperature with a solution of 3.75 g. sodium acetate in 21.25 g. 1,2-propylene glycol brought into distribution equilibrium. The light phase (24 g.) contained 12.4% epichlorohydrin, 1.0% acetic acid, and 78% allylchloride, the heavy phase (51 g.) contained 7.3% epichlorohydrin, 7.8% acetic acid and 40% allylchloride.

EXAMPLE 10

A mixture of 50 g. allylchloride, 9 g. epichlorohydrin and 6 g. acetic acid was through shaking at room temperature with a solution of 2.3 g. sodium acetate in 22.7 glycerol brought into distribution equilibrium. The light phase (60 g.) contained 14.4% epichlorohydrin, 3.2% acetic acid and 82% allylchloride, the heavy phase (30 g.) contained 1.05% epichlorohydrin, 14.0% acetic acid and 3.5% allylchloride.

We claim:

1. A process for the recovery of substantially pure epichlorohydrin from a mixture consisting essentially of epichlorohydrin, allyl chloride and acetic acid which comprises adding to the mixture a polyhydric alcohol of the group consisting of glycerol, glycol, 1,2-propanediol, 1,3-propanediol, butanediols, and mixtures thereof, separating the two liquid phases thus formed from each other, the polyhydric alcohol phase of which contains the major portion of the acetic acid, while the allyl chloride phase contains substantially all of the epichlorohydrin, and subsequently recovering the epichlorohydrin from the allyl chloride phase.

2. A process as defined in claim 1 in which a salt is also added to the mixture, the said salt being selected from the group consisting of lithium chloride, ammonium, sodium, potassium, calcium, and aluminum chlorides, acetates, and propionates, and sodium and potassium lactates, salicylates, oxalates, and citrates.

3. A process as defined in claim 2 in which the salt is added in an amount equivalent to between 1 and 100 parts by weight for each part by weight of the acetic acid in the mixture.

4. A process as defined in claim 2 in which water in an amount equivalent to up to 20% by weight of the polyhydric alcohol is added to the mixture.

5. A process as defined in claim 2 in which the mixture of allyl chloride, epichlorohydrin, and acetic acid is continuously introduced into an extraction column at a point between the top and bottom of the column while a solution of the salt in the polyhydric alcohol is continuously introduced at the top of the said column and allyl chloride is continuously introduced at the bottom of the column while withdrawing the allyl chloride extract containing the major portion of the epichlorohydrin therein at the top of the column and the polyhydric alcohol extract containing the acetic acid at the bottom of the column.

6. A process as defined in claim 5 in which the salt is sodium acetate and the polyhydric alcohol is glycol.

References Cited
UNITED STATES PATENTS

| | | | |
|---|---|---|---|
| 3,150,154 | 9/1964 | Phillips et al. | 260—348.5 L |
| 2,651,604 | 9/1953 | Hartley | 203—16 |
| 2,612,468 | 9/1952 | Morrell et al. | 203—53 |
| 3,578,568 | 5/1971 | Washall | 260—348 R |
| 3,520,907 | 7/1970 | Taylor et al. | 260—348.5 L |
| 3,541,114 | 11/1970 | Taylor et al. | 260—348.5 L |
| 2,156,344 | 5/1939 | Martin | 260—541 |
| 3,663,375 | 5/1972 | Witheford | 203—53 |

WILBUR L. BASCOMB, JR., Primary Examiner

U.S. Cl. X.R.

203—33, 38, 43, 64